US009440193B2

(12) United States Patent
Iida et al.

(10) Patent No.: US 9,440,193 B2
(45) Date of Patent: Sep. 13, 2016

(54) UREA SPRAY SELECTIVE CATALYTIC REDUCTION CONTROL SYSTEM

(75) Inventors: Keiichi Iida, Fujisawa (JP); Shinichi Harada, Yokohama (JP); Masanobu Minezawa, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 260 days.

(21) Appl. No.: 14/345,734

(22) PCT Filed: Aug. 23, 2012

(86) PCT No.: PCT/JP2012/071321
§ 371 (c)(1),
(2), (4) Date: Mar. 19, 2014

(87) PCT Pub. No.: WO2013/047031
PCT Pub. Date: Apr. 4, 2013

(65) Prior Publication Data
US 2014/0227137 A1 Aug. 14, 2014

(30) Foreign Application Priority Data

Sep. 28, 2011 (JP) ................. 2011-212943

(51) Int. Cl.
*F01N 3/00* (2006.01)
*B01D 53/94* (2006.01)
(Continued)

(52) U.S. Cl.
CPC ....... *B01D 53/9495* (2013.01); *B01D 53/9418* (2013.01); *B01D 53/9431* (2013.01);
(Continued)

(58) Field of Classification Search
USPC ....... 60/276, 286, 297, 301, 303; 703/7, 8, 9
See application file for complete search history.

(56) References Cited

U.S. PATENT DOCUMENTS 8,108,154 B2 * 1/2012 Ramamurthy ........ F01N 3/2066
123/25 C
8,578,705 B2 * 11/2013 Sindano ................. F01N 3/208
60/295

(Continued)

FOREIGN PATENT DOCUMENTS

EP 2 226 480 9/2010
EP 2 573 371 3/2013
(Continued)

OTHER PUBLICATIONS

Patent Abstracts of Japan, Publication No. 2007-332785, Published Dec. 27, 2007 (Corresponds to Ref. AB).
(Continued)

*Primary Examiner* — Binh Q Tran
(74) *Attorney, Agent, or Firm* — Staas & Halsey LLP

(57) ABSTRACT

A urea spray selective catalytic reduction ("SCR") control system includes an SCR catalyst provided in a discharge pipe of an engine, a dosing valve for injecting urea water at an upstream side of the SCR catalyst, and NOx sensors, wherein the system controls injection of the urea water from the dosing valve. The system includes a plurality of NOx model maps corresponding to an atmospheric pressure condition, an outdoor air temperature, and an engine water temperature, and determines an amount of NOx from each NOx model map on a basis of detection values of an atmospheric pressure detector, an outdoor air temperature detector, and an engine water temperature detector, and controls an amount of injection of the urea water from the dosing valve on a basis of the amount of NOx thus determined.

3 Claims, 3 Drawing Sheets

(51) Int. Cl.
*F01N 3/20* (2006.01)
*B01D 53/90* (2006.01)

(52) U.S. Cl.
CPC .............. *F01N3/208* (2013.01); *B01D 53/90* (2013.01); *B01D 2251/2067* (2013.01); *B01D 2257/404* (2013.01); *B01D 2258/012* (2013.01); *F01N 2560/026* (2013.01); *F01N 2610/02* (2013.01); *F01N 2900/0412* (2013.01); *F01N 2900/0416* (2013.01); *F01N 2900/08* (2013.01); *F01N 2900/12* (2013.01); *Y02T 10/24* (2013.01)

(56) References Cited

U.S. PATENT DOCUMENTS

| | | | | |
|---|---|---|---|---|
| 8,745,969 B2* | 6/2014 | Sloane | ............... | B01D 53/9409 60/285 |
| 8,762,026 B2* | 6/2014 | Wolfe | ............... | F01N 9/00 60/274 |
| 8,881,508 B2* | 11/2014 | Geveci | ............... | G01N 27/407 60/276 |
| 8,899,024 B2* | 12/2014 | Masaki | ............... | F01N 3/208 60/286 |
| 8,978,362 B2* | 3/2015 | Christner | ............... | B01D 53/9409 60/273 |
| 2013/0152545 A1 | 6/2013 | Chavannavar | | |

FOREIGN PATENT DOCUMENTS

| | | |
|---|---|---|
| JP | 7-26943 | 1/1995 |
| JP | 2000-303826 | 10/2000 |
| JP | 2003-232213 | 8/2003 |
| JP | 2004-360526 | 12/2004 |
| JP | 2010-174657 | 8/2010 |
| JP | 4668852 | 1/2011 |

OTHER PUBLICATIONS

Patent Abstracts of Japan, Publication No. 07-026943, Published Jan. 27, 1995.
Patent Abstracts of Japan, Publication No. 2003-232213, Published Aug. 22, 2003.
Patent Abstracts of Japan, Publication No. 2000-303826, Published Oct. 31, 2000.
Patent Abstracts of Japan, Publication No. 2004-360526, Published Dec. 24, 2004.
Patent Abstracts of Japan, Publication No. 2010-174657, Published Aug. 12, 2010.
International Search Report issued on Oct. 16, 2012 in corresponding International Application No. PCT/JP2012/071321.
Written Opinion of the International Searching Authority mailed Oct. 16, 2012 in corresponding International Application No. PCT/JP2012/071321.
Extended European Search Report mailed May 8, 2015 in corresponding European Application No. 12835975.9.

* cited by examiner

UREA SPRAY SELECTIVE CATALYTIC REDUCTION CONTROL SYSTEM

CROSS-REFERENCE TO RELATED APPLICATIONS

This application claims the foreign priority benefit of Japanese Patent Application No. 2011-212943 filed Sep. 28, 2011, the contents of which are incorporated herein by reference, which serves as priority for PCT Application No. JP2012/071321 filed Aug. 23, 2012.

TECHNICAL FIELD

The present invention relates to a urea spray Selective Catalytic Reduction ("SCR") control system having an SCR device connected in a discharge pipe of an engine and spraying urea in accordance with the amount of NOx in the engine exhaust gas, and more particularly, relates to a urea spray SCR control system capable of appropriately controlling urea spray until a NOx sensor is ready to perform sensing.

BACKGROUND ART

In a urea spray SCR control, control is performed to attain an appropriate amount of urea spray in accordance with an engine-out NOx discharge amount detected by an NOx sensor (Patent Document 1). When the amount of urea spray is too large, ammonia which is a toxic substance is discharged, and when the amount of urea spray is too small, the NOx purification rate is reduced, which affects the exhaust gas performance.

The engine-out the amount of NOx can be detected by an NOx sensor with a high degree of accuracy, which is therefore generally employed, but it takes a certain amount of time for the NOx sensor to become ready to sense the amount of NOx after the activation of the sensor. Due to the structure of the NOx sensor, it is necessary to keep a sensing unit (hereinafter referred to as an element unit) at a high temperature region (e.g., 800° C.); therefore, heating control is performed. Ceramics are used for the element unit; therefore, the element unit is damaged if waterdrops and the like attach to the element when it is in a heated state. Accordingly, when the NOx sensor is used, pre-heating is performed until there is no longer any moisture included in the moisture content included in the exhaust gas immediately after the engine is started (before warm up) and there is no longer any waterdrops generated by condensation and the like in the discharge pipe and by the NOx sensor itself. This pre-heating is to evaporate waterdrops generated within the sensor due to condensation by heating the element at such a temperature that the element is not damaged even when the waterdrops attach to the element (for example, 100 degrees). As described above, the heating control in the high temperature region is performed after it is made sure that there is no longer any chance of waterdrops attached thereto in the pre-heating (hereinafter this control will be referred to as pre-heating control), and thereafter the amount of NOx is sensed (Patent Document 2, 3).

During the time in which the pre-heating control is performed, the amount of NOx cannot be detected, and therefore, in the urea spray control during that period, the amount of injection is determined using NOx model map (the amount of NOx map for each of the engine rotation and the amount of injection commanded), instead of the sensor.

PRIOR ART DOCUMENTS

Patent Document 1: JP 2000-303826 A
Patent Document 2: JP 2004-360526 A
Patent Document 3: JP 2010-174657 A

SUMMARY OF THE INVENTION

The currently available NOx model map is configured to include two NOx maps according to whether the EGR (exhaust gas recirculation system) is activated or not. In this case, in the actual engine control, each control parameter is corrected according to each environment; therefore, the engine-out NOx discharge amount is different according to the used environment. Accordingly, with the current NOx model map configuration, there may occur deviation from the actual amount of NOx due to the difference in the used environment, and the urea spray control cannot be appropriately performed, which may result in ammonia slip and NOx purification rate reduction.

Further, there is a problem in that this deviation of the amount of urea spray may cause false detection in the malfunction diagnosis (probability diagnosis of NOx sensor, and NOx purification rate diagnosis).

Accordingly, it is an object of the present invention to solve the above problem, and to provide a urea spray SCR control system capable of controlling an appropriate amount of urea spray in accordance with an engine-out NOx discharge amount in a period in which a pre-heating control is performed.

In order to solve the above-described object, according to a first aspect of the invention, a urea spray SCR control system includes an SCR catalyst provided in a discharge pipe of an engine and a dosing valve for injecting urea water at an upstream side of the SCR catalyst, wherein the urea spray SCR control system controls injection of the urea water from the dosing valve, and the urea spray SCR control system includes a plurality of NOx model maps corresponding to an atmospheric pressure condition, an outdoor air temperature, and an engine water temperature, and determines the amount of NOx from each NOx model map on the basis of detection values of atmospheric pressure detection means, outdoor air temperature detection means, and engine water temperature detection means, and controls the amount of injection of the urea water from the dosing valve on the basis of the amount of NOx thus determined.

According to a second aspect of the invention, there is provided the urea spray SCR control system according to the first aspect, wherein each of the NOx model maps is stored to a control unit, which includes a base map including a plurality of outdoor air temperature-dependent NOx maps in which the amount of NOx is set in accordance with an engine rotation and an amount of injection commanded on the basis of an outdoor air temperature under an atmospheric pressure condition at a ground level is provided, and an outdoor air temperature map selection factor for selecting an outdoor air temperature-dependent NOx map from the outdoor air temperature-dependent NOx maps using an actual outdoor air temperature, and interpolating the NOx value using the outdoor air temperature-dependent NOx map, and a correction map for correcting the NOx value given by the base map under an atmospheric pressure condition at a height, and further includes an engine water temperature correction map for correcting, with an engine water temperature, the NOx value determined by an atmospheric pressure condition and an outdoor air temperature condition.

According to a third aspect of the invention, there is provided the urea spray SCR control system according to the second aspect, wherein the control unit stores each of NOx model maps in a case where EGR control is performed and where EGR control is not performed.

According to a fourth aspect of the invention, the urea spray SCR control system according to any of the first to third aspect includes a NOx sensor for measuring the amount of NOx in an exhaust gas, wherein during pre-heating control of the NOx sensor, the amount of NOx is determined from each NOx model map on the basis of the detection values of atmospheric pressure detection means, outdoor air temperature detection means, and engine water temperature detection means, and the amount of injection of a urea water from a dosing valve is controlled on the basis of the amount of NOx determined.

According to the present invention, the deviation from the actual amount of NOx can be reduced by determining the engine-out the amount of NOx using multiple NOx model maps according to the difference in the environment such as a pre-heating control period, the atmospheric pressure, the outdoor air temperature, and the like. Therefore, the present invention can achieve superior effects, for example, appropriately performing the urea spray control, eliminating the adverse effect on the exhaust gas performance, preventing false diagnosis of the malfunction diagnosis, and further improving the diagnosis accuracy (threshold value).

DESCRIPTION OF EMBODIMENTS

Preferred embodiments of the present invention will be hereinafter explained with reference to appended drawings.

First, an exhaust gas purification system of an engine will be explained with reference to FIG. 2.

Figure 2:
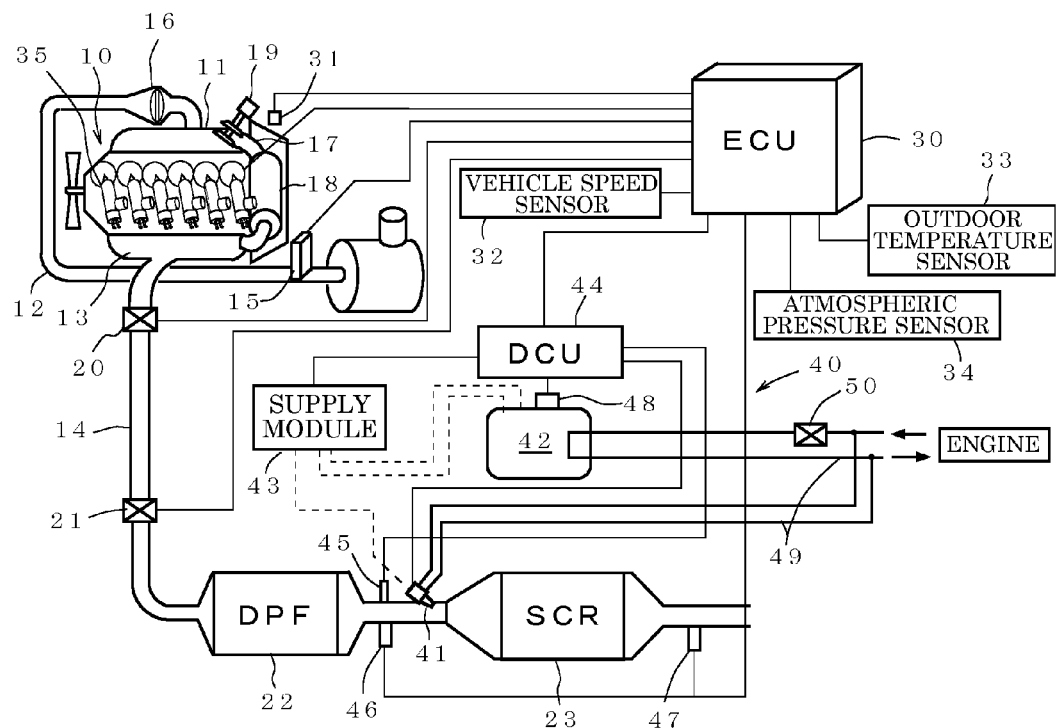
FIG. 2 is a schematic view illustrating an example of an SCR system to which the present invention is applied.

In FIG. 2, an intake pipe 12 is connected to an intake manifold 11 of a diesel engine 10, and a discharge pipe 14 is connected to an exhaust manifold 13. The intake pipe 12 is provided with an air flow sensor 15 for measuring the amount of intake, and with the air flow sensor 15, the degree of opening of an intake throttle valve 16 is controlled, whereby the amount of intake is adjusted.

The exhaust manifold 13 and the intake manifold 11 are connected with an EGR (Exhaust Gas Recirculation) pipe 17 for returning a portion of the exhaust gas back to the intake system of the engine 10 to reduce NOx, and an EGR cooler 18 and an EGR valve 19 are connected to the EGR pipe 17.

In the discharge pipe 14, an exhaust brake valve 20 and an exhaust throttle valve 21 are connected. A diesel particulate filter 22 and an SCR catalyst 23 are provided downstream thereof.

An ECU 30 receives detection values of various kinds of detectors, that is, the detection value of a rotation sensor 31 for detecting the RPM of the engine, the detection value of a vehicle speed sensor 32, the detection value of an outdoor temperature sensor 33, and the detection value of an atmospheric pressure sensor 34.

The ECU 30 controls the amount of injection of fuel at a fuel injector 35 in accordance with the degree of opening of acceleration while the vehicle is driving, and controls the intake throttle valve 16, the exhaust brake valve 20, and the exhaust throttle valve 21 as necessary and controls the amount of EGR by opening/closing the EGR valve 19.

Subsequently, an SCR system 40 made of the SCR catalyst 23 for processing NOx in the exhaust gas from the engine 10 will be explained.

This SCR system 40 includes the SCR catalyst 23 provided in the discharge pipe 14 of the engine 10, a dosing valve 41 for injecting urea water at the upstream side (the upstream side of the exhaust gas) of the SCR catalyst 23, a urea tank 42 for storing the urea water, a supply module (SM) pump for sucking the urea water in the urea tank 42 and providing the urea water to the dosing valve 41, and a supply module 43 having a reverting valve for reverting the surplus urea water back to the urea tank 42, and a dosing control unit (DCU) 44 for controlling the dosing valve 41, the supply module 43, and the like.

The ECU 30 outputs an engine parameter to the dosing control unit 44 in accordance with operation state of the engine 10, and accordingly, the dosing control unit 44 controls the supply module 43 and the dosing valve 41 on the basis of the detection value of each sensor explained below.

An exhaust temperature sensor 45 for measuring the temperature of the exhaust gas at the entrance of the SCR catalyst 23 (SCR entrance temperature) is provided in the discharge pipe 14 at the upstream side of the dosing valve 41. An upstream side NOx sensor 46 for detecting the NOx concentration at the upstream side of the SCR catalyst 23 is provided at the upstream side of the SCR catalyst 23. A downstream side NOx sensor 47 for detecting the NOx concentration at the downstream side of the SCR catalyst 23 is provided at the downstream side of the SCR catalyst 23.

An SCR sensor 48 for measuring the water level, the quality, the temperature, and the like of the urea water is provided in the urea tank 42.

A cooling line 49 for circulating the cooling water for cooling the engine 10 is connected to the urea tank 42 and the supply module 43. The cooling line 49 passes through the urea tank 42, and heat exchange is performed between the cooling water flowing through the cooling line 49 and the urea water in the urea tank 42.

The cooling line 49 is provided with a tank heater valve (coolant valve) 50 for switching whether the cooling water is provided to the urea tank 42 or not. The cooling line 49 is also connected to the dosing valve 41, but regardless of open/close of the tank heater valve 50, the dosing valve 41 is configured to provide the cooling water.

It should be noted that the cooling line 49 is provided to also cool the supply module 43, although simplified and not shown in FIG. 2.

Subsequently, input/output configuration of the dosing control unit (DCU) 44 for controlling the dosing valve 41 and the supply module 43 will be explained with reference to FIG. 3.

Figure 3:
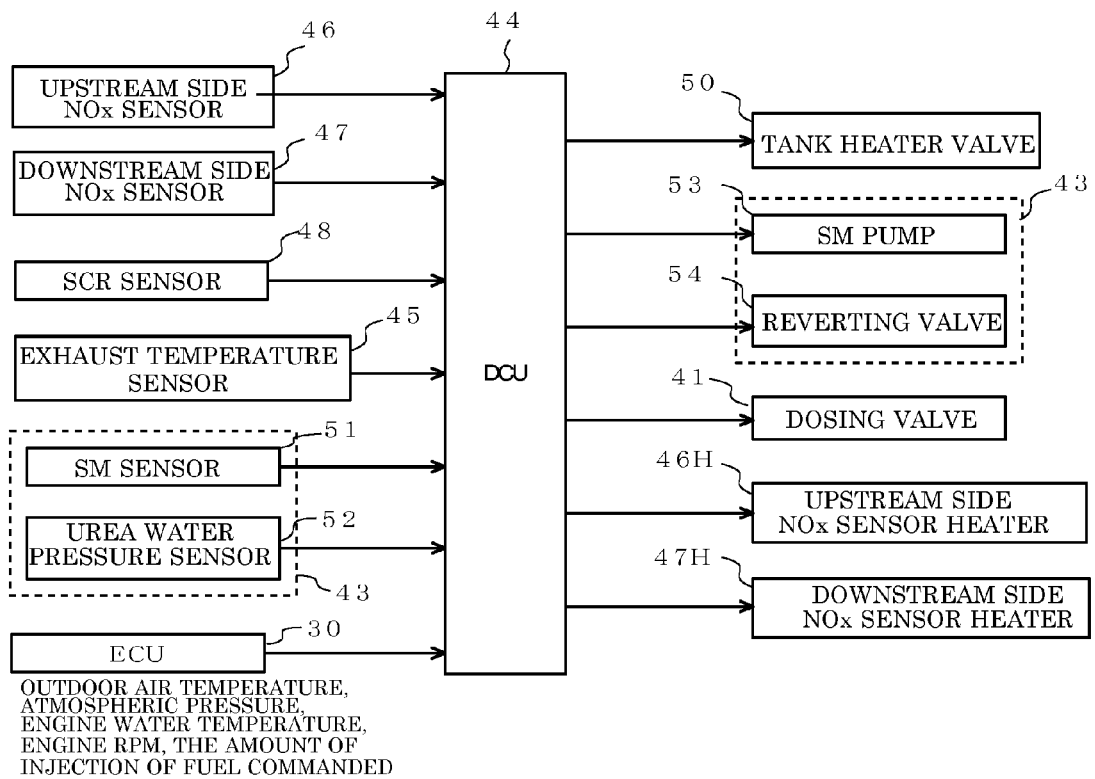
FIG. 3 is a figure illustrating an input/output configuration of a DCU.

As shown in FIG. 3, the DCU 44 receives the detection values of the upstream side NOx sensor 46, the downstream side NOx sensor 47, the SCR sensor 48 (a water level sensor, a temperature sensor, a quality sensor), the exhaust temperature sensor 45, and an SM temperature sensor 51 and a urea water pressure sensor 52 of the supply module 43, and also receives signals of an outdoor air temperature, an atmospheric pressure, an engine parameter (the engine RPM, the amount of injection of fuel commanded, the engine water temperature, and the like) from the ECU 30.

The DCU 44 controls the tank heater valve 50, an SM pump 53 and a reverting valve 54 of the supply module 43, the dosing valve 41, an upstream side NOx sensor heater 46H, and the downstream side NOx sensor heater 47H.

The basic control of this DCU 44 will be explained.

First, the DCU 44 performs pre-heating control of the upstream side NOx sensor 46 and the downstream side NOx sensor 47 when the engine is started. More specifically, the upstream side NOx sensor heater 46H and the downstream side NOx sensor heater 47H preheats the upstream side NOx sensor 46 and the downstream side NOx sensor 47, and thereafter, after the effect of the condensed water such as moisture content is eliminated, the upstream side NOx sensor 46 and the downstream side NOx sensor 47 are maintained at a high temperature to detect the NOx.

Subsequently, after the pre-heating control, the DCU 44 determines the basic urea water amount on the basis of the value of the upstream side NOx sensor 46, corrects the basic urea water amount on the basis of, such as the engine parameter signal and the detection value of the downstream side NOx sensor 47, and determines the urea water amount which is injected from the dosing valve 41 to the SCR catalyst 23.

In the present invention, in the period in which pre-heating control is performed, the upstream side NOx sensor 46 and the downstream side NOx sensor 47 do not detect NOx; therefore, the DCU 44 controls the amount of urea spray in accordance with the engine parameter serving as the engine operation condition given by the ECU 30, the outdoor air temperature, the atmospheric pressure, and the engine water temperature.

This urea spray SCR control system will be explained with reference to FIG. 1.

Figure 1:
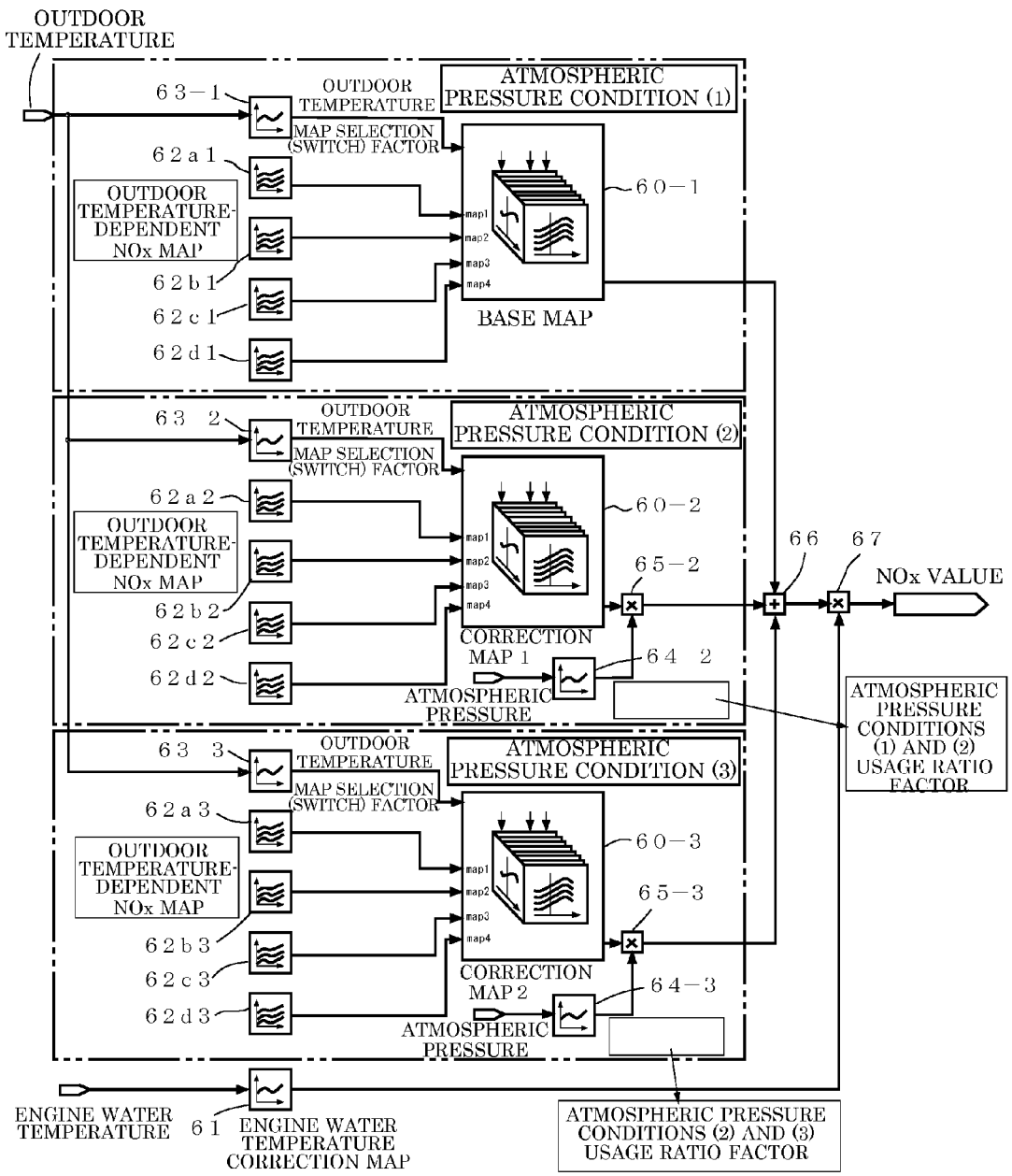
FIG. 1 is a figure illustrating an example of configuration illustrating an NOx model map according to a urea spray SCR control system of the present invention.

FIG. 1 illustrates an example of configuration of a NOx model map stored in the DCU 44 explained with reference to FIG. 3.

FIG. 1 is an example of a NOx model map when an EGR control is performed. In FIG. 1, three NOx model maps 60-1, 60-2, 60-3 according to the atmospheric pressure condition are provided, and further, an engine water temperature correction map 61 is provided. In these three NOx model maps 60-1, 60-2, 60-3, the first NOx model map 60-1 is a base map under an atmospheric pressure condition (1) at the ground, and the second NOx model map 60-2 is a correction map 1 under an atmospheric pressure condition (2) corresponding to, for example, an altitude of 1000 m, and a third NOx model map 60-3 is a correction map 2 under an atmospheric pressure condition (3) corresponding to, for example, an altitude of 2000 m.

First, the first NOx model map 60-1 stores multiple outdoor air temperature-dependent NOx maps 62a1, 62b1, 62c1, 62d1 according to the outdoor air temperature (configured in a range of, for example, 40° C. to +40° C.), and an outdoor temperature map selection factor 63-1 receiving the outdoor air temperature and selecting two outdoor air temperature-dependent NOx maps from these outdoor air temperature-dependent NOx maps 62a1, 62b1, 62c1, 62d1 in accordance with the outdoor air temperature.

These outdoor air temperature-dependent NOx map 62a1, 62b1, 62c1, 62d1 store the amount of NOx determined for each of the amount of injection of fuel commanded and the engine torque when the engine is operated at the outdoor air temperature configured. From the detected outdoor air temperature, the outdoor temperature map selection factor 63-1 selects, from among the outdoor air temperature-dependent NOx maps 62a1, 62b1, 62c1, 62d1, an outdoor air temperature-dependent NOx map (e.g., 62b1) that is configured higher than the detected outdoor air temperature and an outdoor air temperature-dependent NOx map 62c1 that is configured lower than the detected outdoor air temperature, and interpolates the NOx values determined by the outdoor air temperature-dependent NOx maps 62b1, 62c1 with the outdoor air temperature, and outputs the NOx values to an adding device 66.

In contrast to the first NOx model map 60-1, the second, third NOx model maps 60-2, 60-3 include the atmospheric pressure conditions (2), (3) that have been configured, the outdoor air temperature-dependent NOx maps 62a2, 62a3, 62b2, 62b3, 62c2, 62c3, 62d2, 62d3 that have been configured, and correction maps 1, 2 for correcting the NOx values with the outdoor temperature map selection factors 63-2, 63-3. Further, the second, third NOx model maps 60-2, 60-3 include atmospheric pressure correction maps 64-2, 64-3 for interpolating correction NOx values given by the NOx model maps 60-2, 60-3 with the actual atmospheric pressure. The correction NOx values given by the NOx model maps 60-2, 60-3 and the interpolation values of the atmospheric pressure correction maps 64-2, 64-3 are input into the multiplying devices 65-2, 65-3, and the correction NOx is output to the adding device 66.

In these three NOx model maps 60-1, 60-2, 60-3, first, with the first NOx model map 60-1, the NOx value is determined based on the engine operation state (the engine RPM and the amount of injection commanded) and the outdoor air temperature, and the NOx value is input into an adding device 66, and in accordance with the atmospheric pressure condition (2), (3), the correction NOx value is input into the adding device 66 from any one of the multiplying devices 65-2, 65-3 of the second, third NOx model maps 60-2, 60-3. The NOx value of the first NOx model map 60-1 is corrected with the atmospheric pressure conditions (2), (3), and is output to the multiplying device 67, and the multiplying device 67 multiplies it by the correction value given based on the engine water temperature derived from the engine water temperature correction map 61, and the NOx value is output on the basis of the atmospheric pressure, the outdoor air temperature, and the engine water temperature.

These three NOx model maps 60-1, 60-2, 60-3 are an example of configuration illustrating maps when the EGR control is performed. The engine-out NOx value when the EGR control is not performed is different from the NOx value when the EGR control is performed; therefore, three NOx model maps 60 are separately stored to the DCU 44 in view of a case where the EGR control is not performed.

The DCU 44 determines the amount of urea injected by the dosing valve 41 on the basis of the NOx value determined on the basis of the NOx model maps 60-1, 60-2, 60-3 and the engine water temperature correction map 61 in accordance with the engine operation condition (the engine RPM and the amount of injection commanded).

Accordingly, even when NOx is not detected by the NOx sensors 46, 47 during the pre-heating control period, the amount of urea spray can be controlled appropriately.

In the present invention, in order to solve the deviation between the NOx model map and the actual amount of NOx, the NOx model maps corresponding to the difference in the environment (the atmospheric pressure, the outdoor air temperature, the engine water temperature, and the like) are stored to the DCU 44, and by deriving the amount of NOx in association with the difference in the environment, the deviation of the actual amount of NOx can be solved. It is natural that, when there are more maps, the accuracy of the amount of NOx increases, but making extreme number of maps is impractical; therefore, a certain number of maps are made, and the amounts of NOx therebetween is supported by the interpolation values.

As described above, with the present invention, the deviation from the actual amount of NOx can be reduced by making NOx model maps corresponding to the difference in the environment; therefore, with appropriately urea spray control, the effect on the exhaust gas performance can be eliminated, and the false diagnosis of the malfunction diagnosis can be prevented, and further, the diagnosis accuracy (threshold value) can be improved.

In the above embodiments, for example, the three NOx model maps 60 and the engine water temperature correction map 61 are used to determine the NOx value. Alternatively, there may be four or more NOx model maps 60 which are made by further dividing the atmospheric pressure conditions. In the above embodiments, for example, four temperature-dependent NOx maps are provided. Alternatively, four or more temperature-dependent NOx maps may be provided. Further, for example, in this explanation, one of the three NOx model maps 60 is adopted as a base map, and the other of the three NOx model maps 60 are correction maps. Alternatively, they may be constituted by base maps independent under the respective atmospheric pressure condition.

For example, in this explanation, the NOx model maps 60 are stored to the DCU 44. Alternatively, the NOx model maps 60 may be stored to the ECU 30.

The invention claimed is:

1. A urea spray selective catalytic reduction control system comprising:
   a selective catalytic reduction catalyst in a discharge pipe of an engine,
   a dosing valve for injecting urea water at an upstream side of the selective catalytic reduction catalyst, and
   an electronic controller which is configured to control injection of the urea water from the dosing valve by—
   referring to a plurality of NOx model maps which correspond to an atmospheric pressure condition, an outdoor air temperature and an engine water temperature,
   determining an amount of NOx on a basis of detection values of an atmospheric pressure detector, an outdoor air temperature detector, and an engine water temperature detector, and
   controlling the amount of the injection of the urea water from the dosing valve on a basis of the amount of NOx thus determined,
   wherein each of the plurality of NOx model maps is stored to the electronic controller, which includes a base map including a plurality of outdoor air temperature-dependent NOx maps in which the amount of NOx is set in accordance with an engine rotation, and an amount of injection commanded on the basis of an outdoor air temperature under an atmospheric pressure condition at a ground level is provided, and an outdoor air temperature map selection factor for selecting an outdoor air temperature-dependent NOx map from the outdoor air temperature-dependent NOx maps using an actual outdoor air temperature, and interpolating the NOx value using the outdoor air temperature-dependent NOx map, and a correction map for correcting the NOx value given by the base map under an atmospheric pressure condition at a height, and further includes an engine water temperature correction map for correcting, with an engine water temperature, the NOx value determined by an atmospheric pressure condition and an outdoor air temperature condition.

2. The system according to claim 1, wherein the electronic controller stores each of the NOx model maps when exhaust gas recirculation control is performed and when exhaust gas recirculation control is not performed.

3. The system according to claim 1, further comprising an NOx sensor for measuring the amount of NOx in an exhaust gas,
   wherein the electronic controller is configured to—
   refer the NOx model maps which correspond to an atmospheric pressure condition, an outdoor air temperature and an engine water temperature,
   determine the amount of NOx on a basis of detection values of the atmospheric pressure detector, the outdoor air temperature detector, and the engine water temperature detector, and
   control the amount of the injection of a urea water from the dosing valve on a basis of the amount of NOx determined, during pre-heating control of the NOx sensor.

* * * * *